Nov. 20, 1962 P. E. TREYDTE 3,064,868
ADJUSTABLE STRUT FOR CARGO CARRIER
Filed Jan. 25, 1960
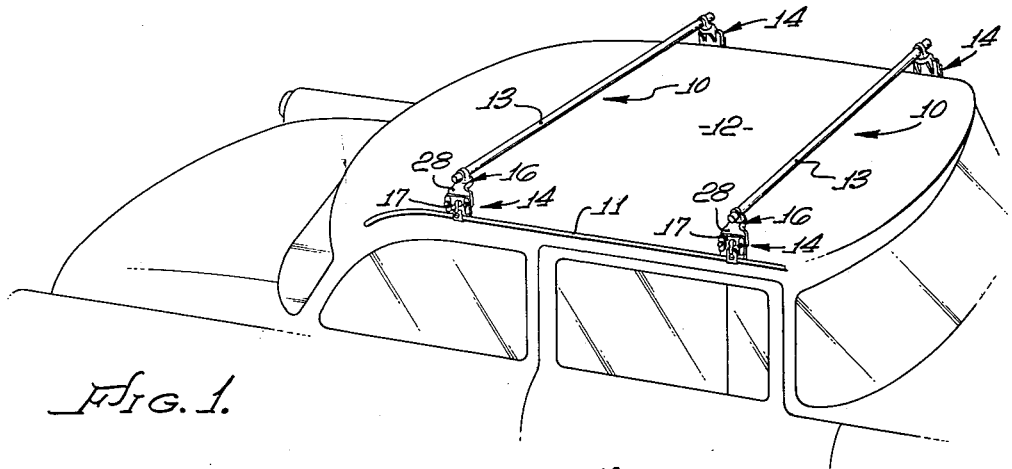
Fig. 1.
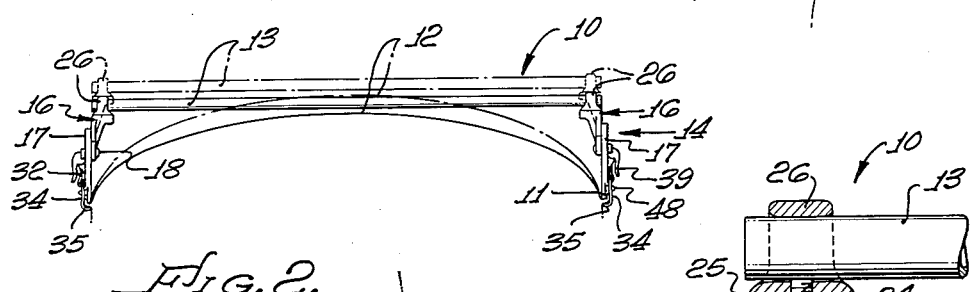
Fig. 2.
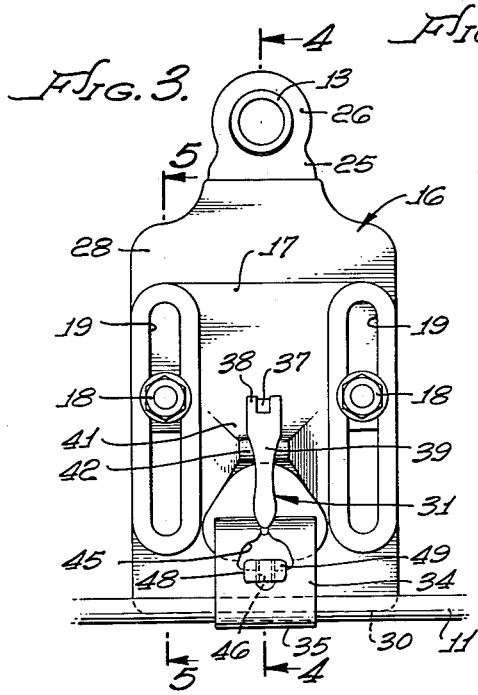
Fig. 3.
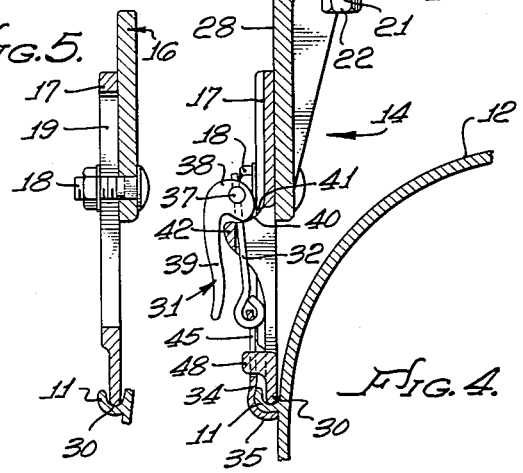
Fig. 5.
Fig. 4.
INVENTOR.
PAUL E. TREYDTE
BY
ATTORNEY.

United States Patent Office 3,064,868
Patented Nov. 20, 1962

3,064,868
ADJUSTABLE STRUT FOR CARGO CARRIER
Paul E. Treydte, Monrovia, Calif., assignor to Quick-N-Easy Products, Ltd., Los Angeles, Calif., a corporation of California
Filed Jan. 25, 1960, Ser. No. 4,303
3 Claims. (Cl. 224—42.1)

This invention relates to cargo carriers for mounting on the tops of motor vehicles, and more particularly to an improved assembly of this type featuring a combined readily adjustable strut and clamping assembly for use in the temporary attachment of a cargo carrier on the top of a motor vehicle.

Motorists have frequent need for additional cargo carrying space and numerous expedients have been heretofore proposed for carrying cargo on the vehicle top. Many of these support the load on the vehicle roof making use of resilient pads interposed between the roof and the cargo carrier proper, the assembly being anchored in place by resort to various devices. These are subject to numerous disadvantages, limitations and shortcomings. For example, there is no standard roof contour and for this reason it is quite impractical to provide a support shaped to accommodate the widely differing roof contours. Furthermore, current roof structures are being formed from lighter and lighter-gauge sheet metal having inadequate interior reinforcing to support loads bearing against the top inwardly of its lateral edges. Additionally, the pads disfigure the surface finish.

Efforts have been made to provide satisfactory devices for transporting cargo by the aid of carriers supported primarily or entirely from the raingutters extending along the roof edges. Among the shortcomings of such devices has been their lack of adaptability to roofs of different designs and particularly different crown heights. It is most important from both a safety and an appearance viewpoint that the cargo be positioned as close as possible to the roof surface for obvious reasons. Certain of the more modern roof designs are relatively flat and have a shallow crown curvature. Others have a very pronounced crown curvature necessitating the use of extra high supporting struts. Furthermore, most cars are designed with a relatively shallow curvature near the front windshield, but a relatively deep curvature at the rear which may be due in part to the downward slope of the raingutter. It is most desirable that the cargo carrier be so designed that it will fit all of these widely varying roof designs with certainty thereby avoiding the need for the prospective purchaser going to the trouble of making a trial assembly of the device to his car before completing the purchase or risking the purchase of a carrier not usable on his car.

The present invention overcomes the shortcomings and defects of prior carriers and provides a universal supporting strut and clamping assembly fulfilling the widest range of requirements and capable of being mounted on any motor vehicle having raingutters. To this end, the strut assembly is formed in two principal parts easily and readily adjustable in length or height and including easily operated means for positively locking these parts in any desired adjusted position requisite for most advantageous use with a particular vehicle. Forming part of the lower half of the strut is a fast-acting toggle clamping device readily adjustable to fit raingutters of any thickness and instantly operable to hold the strut detachably and rigidly anchored to the car roof. Owing to its easily and readily adjustable nature the same strut assembly can be accommodated to any car with one pair of struts being adjusted to support the cargo carrier closely adjacent the shallow front crown of a car roof and the other pair being adjusted to support the rear end of the carrier from the raingutter despite the very substantially deeper crowning of the rear portion of the roof.

Accordingly, it is a primary object of the present invention to provide an improved cargo carrier for detachable attachment to vehicle roofs and featuring a readily adjustable universal strut structure.

Another object of the invention is the provision of an improved combined adjustable cargo strut and clamping assembly for quickly anchoring the strut rigidly to a vehicle roof raingutter.

Another object of the invention is the provision of a mounting strut for a vehicle cargo carrier which strut is made in two principal halves readily adjustable lengthwise of one another, the lower half having a long narrow supporting edge seatable in a vehicle raingutter and including a toggle clamp engageable with the undersurface of the gutter for holding the strut detachably and rigidly assembled thereto.

Another object of the invention is the provision of a vertically adjustable cargo carrying strut featuring a cargo carrier anchorage ring secured to its upper end and utilizing a single threaded fastener for clamping the ring in a desired oriented position as well as for anchoring the carrier proper to the strut assembly.

These and other more specific objects will appear upon reading the following specification and claims and upon considering in connection therewith the attached drawing to which they relate.

Referring now to the drawing in which a preferred embodiment of the invention is illustrated:

FIGURE 1 is a fragmentary view of a motor vehicle showing two pairs of the struts of this invention mounted thereon;

FIGURE 2 is an elevational view from one end of the vehicle roof showing in full lines the position of the struts and cargo carrier for a low crown roof and, in phantom line, the corresponding position of the struts and cargo carrier for a high crown roof;

FIGURE 3 is a side elevational view of the adjustable strut assembly on an enlarged scale;

FIGURE 4 is a cross-sectional view taken along line 4—4 on FIGURE 3; and

FIGURE 5 is a fragmentary sectional view taken along line 5—5 on FIGURE 3.

Referring now more particularly to FIGURE 1, a simple version of a cargo carrier designated generally 10 is shown anchored to the raingutters 11 extending along either side of the roof 12 of a typical motor vehicle. Each of the identical strut assemblies 10 comprises a tubular crossbar 13 to each end of which is rigidly secured the combined vertically adjustable strut and clamping assembly designated generally 14.

Adjustable strut assemblies 14 include an upper inverted L-shaped member 16, a lower wide plate-like strut member 17 adjustably secured to one another as by threaded fasteners 18, provision for the vertical adjustability of these members including a pair of parallel slots 19, 19 formed along the opposite lateral edges of member 17. The shorter horizontal leg 20 of L-shaped member 16 is provided with a bore 21 loosely seating a cap screw 22 extending into a threaded opening 24. This opening is located centrally of a wide flat-surfaced base 25 integral with a ring 26 through which the tubular crossbar tube 13 extends. The length of set screw 22 is so selected that when it is tightly seated within threaded opening 24, base 25 of the ring is rigidly clamped to horizontal leg 20 of the strut and, in addition, crossbar tube 13 is tightly clamped against the interior surface of ring 26. It is therefore seen that the single set screw 22 serves both to clamp ring 26 rigidly to the strut in any desired oriented position as well as to anchor crossbar tube 13 in a desired position adjacent the end of the crossbar.

It is pointed out that the exterior of tube 13 may be provided with a series of notches near its opposite ends to seat the end of the set screw as further assurance against dislodgement of the crossbar from ring 26. However, long service experience has demonstrated that such notches are unnecessary and that there is sufficient resiliency in the tubular crossbar to provide both for the tight anchorage of ring 26 to leg 20 as well as trouble-free anchorage of the crossbar within the ring, it being noted in this connection that ring 26 is preferably formed with a wide interior surface having a relatively snug fit with the exterior of tube 13.

As is best shown in FIGURES 4 and 5, the juxtaposed faces of vertical leg 28 of the L-shaped member 16 and of lower plate 17 are wide and flat. The contacting surfaces of these members are preferably left in a semi-finished rough condition in order that the tightening of threaded fasteners 18, 18 will be highly effective in securing the two principal components of each strut rigidly in a desired adjusted position. In consequence, it is found that the heaviest load safely carryable on the roof of a car may be transported many miles over the roughest roadways without danger of the strut parts becoming dislodged.

The mode of securing strut 14 to the vehicle roof will be best understood by reference to FIGURES 1, 3 and 4. Although lower edge 30 of plate 17 may be formed in numerous contours, a very simple and effective construction makes use of a long, narrow, rounded lower edge having wide-area seating contact against the interior surface of raingutter 11. This long, continuous contact with the gutter provides maximum load distribution along the gutter with minimum hazard to the gutter finish and maximum support for the strut and the load carried thereby against tilting movement in a plane lengthwise of the vehicle.

In the construction here shown, the strut assembly is anchored to the gutter by means of a toggle latch assembly 31 comprising a threaded eyebolt 32 pivotally attached to a plate-like clamping jaw 34, the lower end 35 of which is shaped to conform generally to the shape of the exterior of raingutter 11. The threaded shank end of eyebolt 32 extends diametrically through a cylindrical crosshead 37 having its ends journaled eccentrically in cam-shaped lobes 38 of a toggle operating handle 39. The radially-high lower edges 40 of lobes 38 bear against the upper rounded surfaces 41 of a detent boss 42 protruding outwardly and cast integral with lower strut plate 17. The rear face of boss 42 and the adjacent underlying area of member 17 is cut away to provide for eybolt 32 and the manipulation of the toggle clamp as is made clear by FIGURE 4.

Of importance is the fact that the point of contact of lobe surfaces 40 with cam surfaces 41 in the closed position of the toggle clamp (as viewed in FIGURE 4) is slightly to the right of the load axis acting on the toggle clamp which axis lies approximately along the longitudinal center of the eyebolt shank. In consequence, the load is effective in the closed position of the toggle clamp to rotate the toggle handle 39 counterclockwise as viewed in FIGURE 4 thereby preventing it from opening except by an applied force intentionally applied to move the high point of cam 40 outwardly until it lies to the left of the load axis.

A further and important feature of the toggle latch will be best understood by a consideration of FIGURES 3 and 4 from which it will be noted that the eyebolt is attached to latch member 34 through a rather large triangularly shaped opening 45. Opening downwardly from the lower straight edge of opening 45 is a narrow notch 46 to fit slidably and reciprocably along the opposite vertical sides of the stem of a T-shaped keeper 48, the stem end of which is here shown as cast integral with the outer face of plate 17. Head 49 of keeper 48 lies parallel to the outer face of clamping jaw 34 and holds the clamping jaw from camming outwardly away from gutter 11 as the toggle mechanism is being closed without, however, interfering with the free vertical reciprocal movement of jaw 34. In the fully relaxed position of the toggle clamp, keeper head 49 is aligned with triangular opening 45 and the head is then free to pass through opening 45.

The operation and mode of use of the described structure will be readily understood from the foregoing detailed description of its components and their relationship to one another. Strut assembly 14 is easily adjusted to any particular vehicle by first loosening the nuts to threaded fasteners 18 after a pair of the struts has been secured to the opposite ends of a crossbar 13. The device is then placed across the roof of the car with lower edges 30 of members 17 resting in the respective raingutters. One end of crossbar 13 and the attached L-shaped plate 16 is then elevated so that the misportion of bar 13 is out of contact with the crown of the car roof. The nuts of fasteners 18 are then tightened lightly while a similar adjustment is made on the other strut. When both have been properly adjusted to support bar 13 out of contact with the roof by a safe distance with bar 13 substantially level, fasteners 18 are snugly tightened. The foregoing adjustments are desirably made with the toggle clamp open although this need not be the case. If the clamp is open, jaw 35 will be free and toggle handle 39 will be in a release position. The struts having been properly adjusted, the only remaining operation is to pivot handle 39 downwardly until the high point of cam 40 lies slightly inwardly past the load axis thereby assuring locking of the toggle clamp in its closed position with the bottom of the raingutter held resiliently pressed between edge 30 of the strut and the curved lower end 35 of clamping jaw 34. Preferably, end 35 of the clamping jaw as well as the lower edge 30 of member 17 are coated with resilient material such as an adherent coating of plastic to avoid damaging the surface finish on the vehicle.

Removal of the carrier from the vehicle is accomplished simply by rotating toggle levers outwardly permitting clamping jaws 34 to lower away from engagement with the raingutter. When substantially fully opened, jaw 34 will have moved downwardly sufficiently to permit head 49 of the T-shaped keeper 48 to pass through opening 45 in jaw 34 if necessary to facilitate the detachment of the strut and carrier from the gutter. The cargo carrier may then be transferred to a different vehicle with either a higher or lower crowned roof. The strut is readily accommodated to the different crown shape simply by loosening fasteners 18 and readjusting the relative position of main strut components 16 and 17 in the manner described above.

While the particular adjustable strut for cargo carrier herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A vertically adjustable strut assembly for releasably anchoring a cargo carrier to the raingutters of a motor vehicle roof with the carrier out of contact with the roof surface, said assembly comprising a rigid cargo carrier having tubular ends, an inverted L-shaped upper member having a horizontal leg and a wide-surfaced downwardly extending vertical leg, continuous ring means carried by said horizontal leg receiving and rigidly clamping said horizontal leg to said rigid cargo carrier, a plate-like clamping member extending below and positioned against the vertical leg of said L-shaped member and adjustable vertically therealong, means including a plurality of threaded fasteners for immovably clamping said members in any desired adjusted position, said clamping member having a long, narrow lower edge adapted to have wide-based seating contact lengthwise of a vehicle raingutter, adjustable clamping means carried by said clamping member for clamping said strut assembly to a raingutter including a clamping jaw restricted to vertical reciprocal movement along the exterior face of said clamping member and including an arcuate-shaped jaw for engaging the lower outer surface of the raingutter at points underlying the lower edge of said clamping member while seated within said gutter, the tightening of said clamping means being effective to lock said strut assembly rigidly to said gutter, the upper surface of the horizontal leg of said L-shaped member supporting said continuous ring means and having a wide flat surface generally normal to its axis, said ring means having a threaded opening therethrough seating a headed clamping screw the shank of which passes freely through a vertical opening into the L-shaped member, the length of the shank of said screw being so related to the length of said vertical opening and the diameter of both said ring means and of said cargo carrier received therewithin that the tightening of said screw is effective to clamp said ring means rigidly in place and to clamp said cargo carrier seated in said ring means and against displacement therefrom.

2. A vertically adjustable strut and carrier assembly releasably anchoring a cargo carrier to the rain gutters of a motor vehicle roof with the cargo carrier supported out of contact with the roof surface, said assembly comprising a pair of wide plate-like strut members one of which is provided with a pair of parallel slots adjacent its opposite lateral edges, the other strut member having a pair of threaded shanks mounted thereon positioned to be freely slidable along said slots when the two members are placed against one another, fastener means carried by said threaded shanks for clamping said plates together in any desired relative position of said plates permitted by the lengths of said slots, said cargo carrier having tubular ends, means at the outer end of one of said members anchoring the same to the tubular ends of said cargo carrier and including a ring member and a single threaded fastener having a head thereon and an effective length to clamp the ring member to said strut and simultaneously to clamp the tubular end of said cargo carrier within said ring member by endwise abutment of the fastener end against the side of said tubular member, the remote end of the other strut member being adapted to seat downwardly into the rain gutter, and toggle clamp means carried on the exterior face of said last-mentioned strut member in an area spaced horizontally between said pair of slots and vertically between the opposite ends thereof, said clamp means including an L-shaped clamping jaw shaped to embrace and grip the under surface of the rain gutter and in the closed position of said toggle being cooperable with the portion of the strut seated in the gutter to clamp said strut assembly rigidly to the rain gutter and in upstanding relation thereabove.

3. A vertically adjustable strut assembly as defined in claim 2 characterized in that said elongated slots extend along the opposite lateral edges of the lower one of said plate-like strut members, the area of said lower strut member between said slots having a generally U-shaped boss projecting outwardly therefrom with the ends of its legs integral with said strut, said toggle clamp means having an eye-bolt extending loosely and vertically between the legs of said boss with its upper end journaled to the cammed end of a toggle lever forming part of said toggle clamp means, the other lower end of said eye-bolt being connected to said clamping jaw, the cammed end of said toggle lever being positioned to bear against the upper edges of the legs of said U-shaped boss, and the bight portion of said boss cooperating with said boss legs in holding said eye-bolt captive on said lower strut member while leaving said bolt free to move lengthwise through said boss.

References Cited in the file of this patent

UNITED STATES PATENTS

| | | |
|---|---|---|
| 1,700,120 | Campbell | Jan. 29, 1929 |
| 2,480,438 | Bergman et al. | Aug. 30, 1949 |
| 2,531,107 | Burkey | Nov. 21, 1950 |
| 2,728,502 | Plantico | Dec. 27, 1955 |
| 2,764,438 | Haviland | Sept. 25, 1956 |
| 2,887,237 | Ellingson | May 19, 1959 |
| 2,941,671 | Lewis et al. | June 21, 1960 |

UNITED STATES PATENT OFFICE
CERTIFICATE OF CORRECTION

Patent No. 3,064,868            November 20, 1962

Paul E. Treydte

It is hereby certified that error appears in the above numbered patent requiring correction and that the said Letters Patent should read as corrected below.

In the grant, lines 2 and 12, and in the heading to the printed specification, lines 3 and 4, for "Quick-N-Easy Products, Ltd." read -- Quik-N-Easy Products, Ltd. --.

Signed and sealed this 27th day of August 1963.

(SEAL)
Attest:

ERNEST W. SWIDER
Attesting Officer

DAVID L. LADD
Commissioner of Patents